(12) United States Patent
Werntges et al.

(10) Patent No.: US 11,559,956 B2
(45) Date of Patent: Jan. 24, 2023

(54) METHOD AND APPARATUS FOR RAPID CONTINUOUS CONSOLIDATION OF THERMOPLASTIC COMPONENTS

(71) Applicant: The Boeing Company, Chicago, IL (US)

(72) Inventors: Paul Gabriel Werntges, Charleston, SC (US); Aaron Ross Cowin, Dardenne Prairie, MO (US); Eileen Miller, Summerville, SC (US); Randall Dow Wilkerson, O'Fallon, MO (US); Joshua Paul Koehn, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 383 days.

(21) Appl. No.: 16/670,414

(22) Filed: Oct. 31, 2019

(65) Prior Publication Data
US 2021/0129461 A1 May 6, 2021

(51) Int. Cl.
*B29C 70/54* (2006.01)
*B29C 70/34* (2006.01)
(Continued)

(52) U.S. Cl.
CPC .............. *B29C 70/54* (2013.01); *B29C 70/34* (2013.01); *B32B 15/14* (2013.01);
(Continued)

(58) Field of Classification Search
None
See application file for complete search history.

(56) References Cited

U.S. PATENT DOCUMENTS 2,958,095 A * 11/1960 Ahlefeld, Jr. ........... B29C 43/06
264/37.3
3,246,055 A 4/1966 Pendleton
(Continued)

FOREIGN PATENT DOCUMENTS

JP 02-188240 A * 7/1990
JP 2005-144684 A * 6/2005

OTHER PUBLICATIONS

Machine Translation of Japanese Patent 02-188240. Date Unknown.*
(Continued)

*Primary Examiner* — Jeffry H Aftergut
(74) *Attorney, Agent, or Firm* — MH2 Technology Law Group LLP (57) ABSTRACT

A method and structure for processing a plurality of prepreg sheets includes a conveyor assembly having a first conveyor, a second conveyor, and a processing zone positioned between the first and second conveyors. In an implementation, a plurality of prepreg sheets are advanced from a plurality of material supply creels into the processing zone by a first conveyor and a second conveyor turning in opposite directions. Within the processing zone, a compressive pressure is applied to the prepreg sheets by first pressure plates attached to first conveyor and second pressure plates attached to the second conveyor. A thermoplastic within the prepreg sheets is melted within the processing zone by a heater to consolidate the prepreg sheets into a consolidated laminate.

7 Claims, 3 Drawing Sheets

(51) Int. Cl.
*B32B 15/14* (2006.01)
*B32B 37/10* (2006.01)
*B29K 307/04* (2006.01)
*B29K 101/12* (2006.01)

(52) U.S. Cl.
CPC ...... *B32B 37/1027* (2013.01); *B29K 2101/12* (2013.01); *B29K 2307/04* (2013.01); *B32B 2262/106* (2013.01)

(56) References Cited

U.S. PATENT DOCUMENTS

| | | | | |
|---|---|---|---|---|
| 4,151,031 | A | * | 4/1979 | Goad ................ B29C 65/5092 156/499 |
| T101,401 | I4 | * | 1/1982 | Zion ............................ 156/433 |
| 4,449,910 | A | * | 5/1984 | Leloux ............... B29C 49/0021 425/336 |
| 5,876,553 | A | * | 3/1999 | Kaiser .................. B29C 70/525 156/433 |
| 2007/0175572 | A1 | | 8/2007 | Rubin et al. |

OTHER PUBLICATIONS

Specificaiton of U.S. Defensive Publicaiton T101401 Dated Jan. 5, 1982.*
Machine Translation of Japanese Patent 2005-144684, Date Unknown.*

* cited by examiner

FIG. 5

METHOD AND APPARATUS FOR RAPID CONTINUOUS CONSOLIDATION OF THERMOPLASTIC COMPONENTS

TECHNICAL FIELD

The present teachings relate to the field of carbon fiber composites and, more particularly, to carbon fiber reinforced polymer blanks and methods and structures for preparing and processing (e.g., molding and shaping) carbon fiber reinforced polymer blanks.

BACKGROUND

Structures manufactured from carbon fiber reinforced polymer (CFRP) panels are commonly used in industries such as aircraft manufacture. CRFP structures typically include a plurality of carbon fiber layers pre-impregnated with a thermoset resin, referred to as prepregs. A prepreg is commonly positioned within a vacuum bag and onto a contoured mandrel which is used to shape the prepreg, and the prepreg is debulked by removing air from between the carbon fiber layers by applying a vacuum to the vacuum bag. Once the prepreg has been debulked, heat is applied to cure the shaped prepreg within an autoclave. Thermoset prepregs can cure over time during storage at room temperature and thus have a shelf life, which can be extended by storing the prepregs at low temperatures.

Some structures can be formed using a prepreg that includes a plurality of carbon fiber layers pre-impregnated with a thermoplastic resin rather than a thermoset resin. Thermoplastic prepregs have an advantage over thermoset prepregs as they can be stored indefinitely at room temperature. These structures can be shaped using a process similar to that described above for CFRP panels that use a thermoset resin, except the prepregs are heated to melt the thermoplastic and cooled to solidify the thermoplastic. Thermoplastic prepregs can be reheated to reshape the prepreg.

Preparing prepregs within a vacuum bag, shaping the prepreg using a shaped mandrel, and curing the prepreg within an oven or autoclave requires costly equipment and is therefore an expensive process.

A method and structure that simplifies the preparation of CFRP blanks, and a process which uses the CFRP blanks, would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation, a conveyor assembly for processing a plurality of prepreg sheets includes a first conveyor subassembly and a second conveyor subassembly. The first conveyor subassembly includes a first conveyor configured to turn in a first direction, a plurality of first pressure plates attached to the first conveyor, wherein each first pressure plate of the plurality of first pressure plates includes a first face, and a rigid first plate including a track, wherein the first conveyor is positioned within the track of the rigid first plate. The second conveyor subassembly includes a second conveyor configured to turn in a second direction opposite the first direction, a plurality of second pressure plates attached to the second conveyor, wherein each second pressure plate of the plurality of second pressure plates includes a second face, and a rigid second plate including a track, wherein the second conveyor is positioned within the track of the rigid second plate. The conveyor assembly further includes a processing zone positioned between the first conveyor subassembly and the second conveyor subassembly, and at least one heater positioned in the processing zone.

Optionally, the conveyor assembly can further include a plurality of material supply creels configured to supply a plurality of prepreg sheets to the processing zone of the conveyor assembly, and may include a plurality of prepreg sheets on the plurality of material supply creels and positioned between a plurality of the first faces and a plurality of the second faces within the processing zone. In an implementation, the plurality of the first faces and the plurality of the second faces apply a compressive pressure to the plurality of prepreg sheets within the processing zone, where the compressive pressure can be from 1.0 bar to 50.0 bar.

The conveyor assembly can also include two metal foil supply creels and two metal foil layers on the two metal foil supply creels, wherein the two metal foil layers are positioned between the plurality of the first faces and the plurality of the second faces within the processing zone, and the plurality of the first faces and the plurality of the second faces apply a compressive pressure to the two metal foil layers within the processing zone.

In an optional implementation, the conveyor assembly can further include a first plurality of springs attached to the plurality of first pressure plates and the first conveyor, and a second plurality of springs attached to the plurality of second pressure plates and the second conveyor, wherein the first plurality of springs and the second plurality of springs can be configured to apply a compressive pressure to a plurality of prepreg sheets within the processing zone.

In another implementation, a conveyor assembly for processing a plurality of prepreg sheets includes a first conveyor subassembly and a second conveyor subassembly. The first conveyor subassembly include a first conveyor configured to turn in a first direction, the first conveyor including a plurality of first pressure plates connected together by a first plurality of links, wherein each first pressure plate of the plurality of first pressure plates includes a first face, and a plurality of first pressure wheels configured to apply a compressive pressure to the plurality of first pressure plates. The second conveyor subassembly includes a second conveyor configured to turn in a second direction opposite the first direction, the second conveyor including a plurality of second pressure plates connected together by a second plurality of links, wherein each second pressure plate of the plurality of second pressure plates includes a second face, and a plurality of second pressure wheels configured to apply a compressive pressure to the plurality of second pressure plates. The conveyor assembly further includes a processing zone positioned between the first conveyor subassembly and the second conveyor subassembly and at least one heater positioned in the processing zone.

Optionally, the conveyor assembly can further include a plurality of material supply creels configured to supply a plurality of prepreg sheets to the processing zone of the conveyor assembly, and can further include a plurality of prepreg sheets on the plurality of material supply creels and positioned between a plurality of the first faces and a plurality of the second faces within the processing zone. The plurality of the first faces and the plurality of the second faces can apply a compressive pressure to the plurality of prepreg sheets within the processing zone, where the compressive pressure can be from 1.0 bar to 50.0 bar. In an optional implementation, The conveyor assembly can further include two metal foil supply creels and two metal foil layers on the two metal foil supply creels, wherein the two metal foil layers are positioned between the plurality of the first faces and the plurality of the second faces within the processing zone and the plurality of the first faces and the plurality of the second faces apply a compressive pressure to the two metal foil layers within the processing zone.

In another implementation, a method for processing a plurality of prepreg sheets into a consolidated laminate can include advancing the plurality of prepreg sheets into a processing zone of a conveyor assembly, wherein the processing zone is positioned between a first conveyor subassembly and a second conveyor subassembly and applying a compressive pressure to the plurality of prepreg sheets within the processing zone using a plurality of first pressure plates of the first conveyor subassembly and a plurality of second pressure plates of the second conveyor subassembly. The method further includes turning the first conveyor in a first direction and the second conveyor in a second direction opposite to the first direction to advance the plurality of prepreg sheets through the processing zone and heating the plurality of prepreg sheets within the processing zone using a heater to melt and/or flow a thermoplastic within the plurality of prepreg sheets.

Optionally, the method can further include applying a compressive pressure of from 1.0 bar to 50.0 bar during applying of the compressive pressure to the plurality of prepreg sheets, and can also optionally include heating the plurality of prepreg sheets to a temperature of from 460° F. to 780° F. within the processing zone during the heating of the plurality of prepreg sheets. In an implementation, the heater can be a first heater and the temperature can be a first temperature, where the method further includes cooling the plurality of prepreg sheets to a second temperature of from 400° F. to 600° F. within the processing zone using a second heater, where the second temperature is at least 20° F. cooler than the first temperature.

In an optional implementation, the method can further include advancing the plurality of prepreg sheets into the processing zone from a plurality of material supply creels, and can further include advancing two metal foil layers from two metal foil supply creels into the processing zone, wherein the plurality of prepreg sheets are positioned between the two metal foil layers within the processing zone, and applying the compressive pressure to the two metal foil layers within the processing zone. Optionally, the method can further include turning the first conveyor in the first direction, and the second conveyor in the second direction, at a rate of from 2.0 inches per minute to 20.0 inches per minute.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

As used herein, unless otherwise specified, the word "thermoset" encompasses any polymer, resin, or plastic that is malleable, pliable, and/or liquid prior to curing and becomes irreversibly hardened after curing by heat, radiation, or another technique suitable for the particular thermoset. Additionally, a "thermoplastic" is a polymer, resin, or plastic that is malleable when heated above a melting temperature and solidifies upon cooling below the melting temperature.

An implementation of the present teachings includes a method and structure for preparing and processing fiber-reinforced polymer (FRP) blanks such as carbon fiber reinforced polymer (CFRP) blanks from a prepreg including a plurality of carbon fiber layers impregnated with a thermoplastic. The method includes a process that can form a plurality of FRP blanks during a continuous process, and can include a sub-process that molds or shapes the FRP blanks either immediately after forming the FRP blanks or at a later time, for example, after storing the FRP blanks for an indeterminate duration of time.

Figure 1:
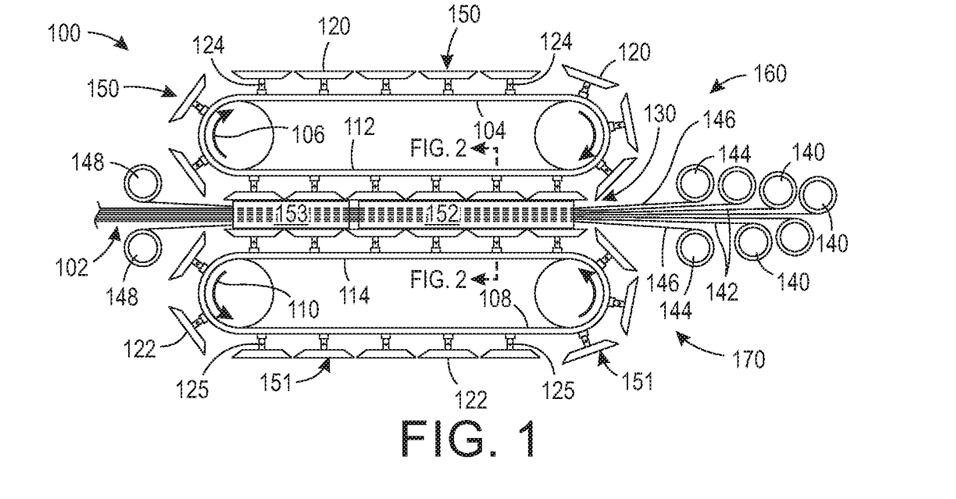
FIG. 1 is a side view of a conveyor assembly according to an implementation of the present teachings.
Figure 3:
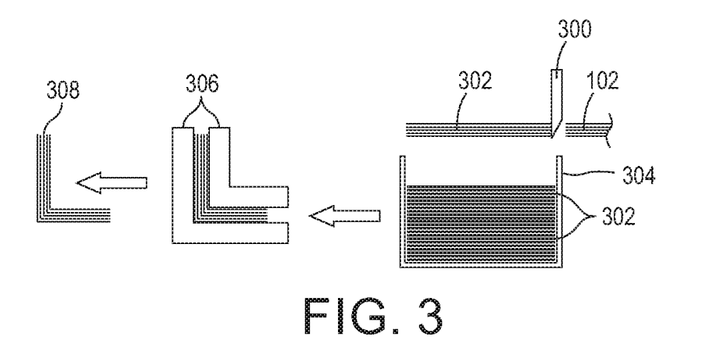
FIG. 3 is a schematic depiction of further processing of a consolidated laminate formed by the conveyor assembly in accordance with a method of the present teachings.

FIG. 1 is a schematic side view depicting a conveyor assembly 100 for processing a continuous consolidated laminate 102 into a plurality of FRP blanks (302, FIG. 3). The conveyor assembly 100 can be a subassembly of a larger FRP processing system as described in more detail below, or a standalone assembly. It will be appreciated that an FRP processing system according to an implementation of the present teachings can include additional structures that have not been depicted for simplicity, while various depicted structures can be removed or modified.

The conveyor assembly 100 of FIG. 1 can include an upper (i.e., a first) conveyor subassembly 160 and a lower (i.e., second) conveyor subassembly 170. The conveyor assembly 100 further includes an upper (i.e., a first) conveyor 104 configured to rotate in a first direction 106 (i.e., clockwise as depicted in FIG. 1) and a lower (i.e., a second) conveyor 108 configured to rotate in a second direction 110 (i.e., counterclockwise as depicted in FIG. 1) that is opposite to the first direction 106. The upper conveyor 104 is positioned within, and rotates through, a rigid upper (i.e., first) plate 112, and the lower conveyor 108 is positioned within, and rotates through, a rigid lower (i.e., second) plate 114, as depicted the side view of FIG. 1. As depicted in the cross section of FIG. 2, each rigid plate 112, 114 can include one or more tracks 200 through which the conveyors 104, 108 turn. The tracks 200 provide support for the conveyors 104, 108 and guide the conveyors 104, 108 through the rigid plates 112, 114, and maintain the conveyors 104, 108 in place within a processing zone 130 during processing of prepreg sheets 142 provide as described below.

Figure 2:
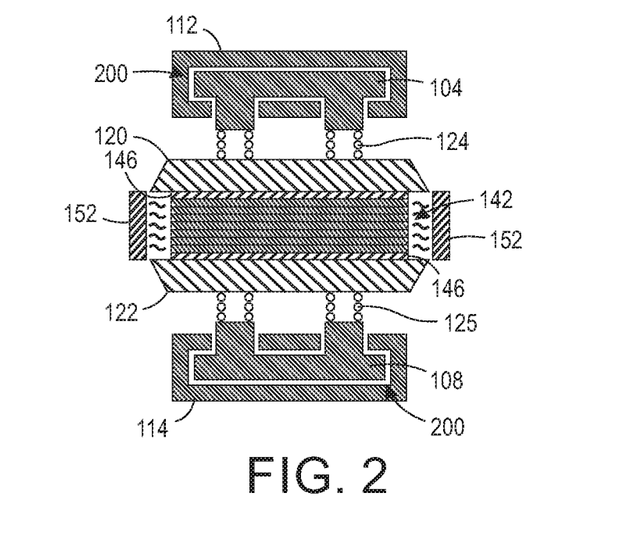
FIG. 2 is a cross section of the conveyor assembly of FIG. 1 at the location indicated in FIG. 1.

The conveyor assembly 100 further includes a plurality of upper (i.e., first) pressure plates 120 and a plurality of lower (i.e., second) pressure plates 122, where each upper pressure plate 120 is physically attached to the upper conveyor 104 and each lower pressure plate 122 is physically attached to the lower conveyor 108. The pressure plates 120, 122 can be manufactured from a heat resistant and thermally conductive material such as carbon steel or titanium, or another suitable material. In FIGS. 1 and 2, the upper pressure plates 120 are attached to the upper conveyor 104 using a first plurality of springs 124 and the lower pressure plates 122 are attached to the lower conveyor 108 using a second plurality of springs 125. In the implementation of FIGS. 1 and 2, at least two springs 124, 125 are attached to each of the pressure plates 120, 122 respectively, although only one spring, three springs, or four or more springs attached to each of the pressure plates 120, 122 is contemplated. Further, the upper pressure plates 120 and the lower pressure plates 122 are spaced around the upper conveyor 104 and the lower conveyor 108 respectively so that each upper pressure plate 120 is paired and aligned with a lower pressure plate 122 within the processing zone 130 of the conveyor assembly 100, where the processing zone 130 is positioned between the upper conveyor assembly 160 and the lower conveyor assembly 170, between the rigid upper plate 112 and the rigid lower plate 114, and between the upper pressure plates 120 and the lower pressure plates 122.

As depicted in FIG. 1, the conveyor assembly 100 further includes a plurality of material supply creels 140 supplying a plurality of prepreg sheets 142, where each material supply creel 140 supplies one prepreg sheet 142, and each prepreg sheet 142 includes one or more fiber layers such as a carbon fiber layer pre-impregnated with a thermoplastic. Additionally, the conveyor assembly 100 includes two metal foil supply creels 144 and two metal foil layers 146, where each metal foil supply creel 144 includes one of the metal foil layers 146, such as a thin steel metal foil. The metal foil supply creels 144 are configured to supply the metal foil layers 146 while the metal foil layers 146 are advanced into the processing zone 130. The conveyor assembly 100 further includes two metal foil take-up creels 148, where each take-up creel 148 is configured to collect one of the metal foil layers 146 after use (i.e., after the two metal foil layers 146 exit the processing zone 130).

The conveyor assembly 100 also includes at least a first heater 152 such as an infrared heater, a coil heater, an impingement air heater, etc., configured to heat the plurality of prepreg sheets 142. FIG. 1 further depicts a second heater 153 which can output the same or a different temperature than the first heater 152. In one implementation, the first heater 152 can output a first temperature and the second heater 153 can output a second temperature lower than the first temperature, such that the first heater 152 quickly elevates (e.g., ramps up) a temperature of the plurality of prepreg sheets 142 to (or above) a melting temperature of the thermoplastic included within each prepreg sheet 142, and the second heater 153 slows (e.g., ramps down) a cooling of the thermoplastic.

During use of the conveyor assembly 100 of FIGS. 1 and 2, the upper conveyor 104 turns in the first direction 106 and the lower conveyor 108 turns in the opposite second direction 110, thereby advancing each of the upper pressure plates 120 and lower pressure plates 122 into the processing zone 130. Within the processing zone 130, a first face 150 of each upper pressure plate 120 is aligned with, and spaced from, a second face 151 of one of the lower pressure plates 122 with which it is paired. Further, the conveyor assembly 100 will generally be designed to minimize a gap between adjacent pressure plates within the processing zone to decrease mark off (i.e., ridges, contours, etc.) in the finished consolidated laminate 102. The use of the two metal foil layers 146 by positioning the plurality of prepreg sheets 142 between the two metal foil layers 146, and applying a compressive pressure or force to the two metal foil layers 146 within the processing zone 130, can further reduce mark off in the consolidated laminate 102. The spacing between the first face 150 and the second face 151 is designed and adjusted such that a desired compressive pressure is applied to the plurality of prepreg sheets 142 within the processing zone 130 between the paired upper and lower pressure plates 120, 122. Additionally, the advancement of the upper and lower pressure plates 120, 122 through the processing zone 130 that results from the turning of the conveyors 104, 108 unreels and advances the plurality of prepreg sheets 142 from the plurality of material supply creels 140 into and through the processing zone 130.

As the plurality of prepreg sheets 142 advance through the processing zone 130, the prepreg sheets 142 and, to some extent, the area between the rigid upper plate 112 and the rigid lower plate 114, are heated by the heaters 152, 153, thereby heating the plurality of prepreg sheets 142 and flowing the thermoplastic within the prepreg sheets 142. The prepreg sheets 142 are advanced through the processing zone 130 at a sufficiently low rate of speed to ensure that the thermoplastic within the prepreg sheets 142 is sufficiently melted and flowed to adhere the prepreg sheets 142 into the consolidated laminate 102. Additionally, thermal energy from the heaters 152, 153 can heat the pressure plates 120, 122. This thermal energy from the pressure plates 120, 122 can be transferred to the prepreg sheets 142, thereby increasing the heating efficiency of the conveyor assembly 100.

As depicted, the metal foil layers 146 are advanced through the processing zone 130 in a manner similar to the prepreg sheets 142. The metal foil layers 146 physically contact the faces 150, 151 of the upper and lower pressure plates 120, 122 and prevent physical contact of the faces 150, 151 with the prepreg sheets 142, which could otherwise result in transfer of thermoplastic to the faces 150, 151 and adhering of the prepreg sheets 142 to the pressure plates 120, 122. In an implementation, the metal foil layers 146 function as release layers for the consolidated laminate 102, and thus may be coated with a sufficient high-temperature mold release on the surfaces that physically contact the prepreg sheets. After the prepreg layers 142 exit the processing zone 130, they cool to provide the consolidated laminate 102 as depicted. The metal foil take-up creels 148 collect the metal foil layers 146 as they are stripped off the consolidated laminate 102. The metal foil layers 146 can then be processed for re-use, for example, by reapplying the coating to the metal foil layers 146 during transfer back to the metal foil supply creels 144.

In an implementation, the conveyors 104, 108 can turn, and thus the upper and lower plates 120, 122 and the prepreg sheets 142 can advance, at a rate of from about 2 inches per minute (in/min) to about 20 in/min, or from about 10 in/min to about 14 in/min, for example about 12 in/min (60 feet/hour), or another sufficient rate. In general, the advance rate of the upper conveyer 104 will be the same as the advance rate of the lower conveyor 108. Depending on the particular thermoplastic, the prepreg sheets 142 can be heated to a temperature of from about 460° F. to about 780° F., or from about 570° F. to about 670° F. within the processing zone 130. In an implementation using first and second heaters 152, 153 (depending on various factors such as the distance from the heaters 152, 153 to the prepreg sheets 142, the length of the heaters 152, 153 within the processing zone 130), the first heater 152 (and thus the prepreg sheets 142 proximate the first heater) can be heated to a first temperature of from about 460° F. to about 780° F., or from about 570° F. to about 670° F., while the second heater 153 (and thus the prepreg sheets 142 proximate the second heater 153) can be heated to a second temperature of from about 400° F. to about 600° F., where the second heater is at least 20° cooler than the first heater. A length of the processing zone 130 where compressive pressure is applied to the prepreg sheets 142 can be from about 3.0 feet to about 20 feet long, for example about 10.45 feet long. In the implementation of FIG. 1 using two heaters 152, 153, the first heater 152 can be from about 4.0 feet to about 10 feet long, for example about 7.0 feet long. The second heater 153 can be from about 2 feet to about 5 feet long, for example about 3.5 feet long. The length of the processing zone 130 will depend upon the width, thickness, and ply count of the prepreg sheets 142, the composition of the resin included in the prepreg sheets 142, and the advance rate of the prepreg sheets 142 through the processing zone 130. The length of the processing zone 130 and temperature of the heater(s) 152, 153 should be sufficient to heat the prepreg sheets 142 to a temperature sufficient to melt the resin and maintain the resin at a crystallization temperature for a desired duration of time.

In this implementation, the springs 124, 125 are designed and sized to force the pressure plates 120, 122 toward the prepreg sheets 142 as the pressure plates 120, 122 engage and physically contact the metal foil layers 146 within the processing zone 130, and to apply the compressive pressure to the plurality of prepreg sheets, at least in part. The force applied to the pressure plates 120, 122 by the springs 124, 125 is transferred from the pressure plates 120, 122 to the metal foil layers 146 then to the plurality of prepreg sheets 142. In an implementation, a compressive pressure of from about 1.0 bar to about 50.0 bar can be applied to the prepreg sheets 142 by (or using) the pressure plates 120, 122. In another aspect, the pressure applied should be sufficient to achieve consolidation and/or adhesion of the prepreg sheets 142 to form the consolidated laminate 102. A compressive pressure that is excessive can result in thin-out (i.e., squeeze out) of the resin, and a thinner completed consolidated laminate. A compressive pressure that is too low can result in poor consolidation of the prepreg sheets 142. Thus either an insufficient or excessive compressive pressure can result in poor consolidation between and among the plurality of prepreg sheets 142 and delamination of the consolidated laminate 102 during use.

The conveyor assembly 100 of FIGS. 1 and 2 thus provide continuous processing of a plurality of prepreg sheets 142 from a plurality of creels 140. After forming the consolidated laminate 102 using the conveyor assembly 100 of FIG. 1, the conveyor assembly 100 may be stored or further processed. For example, FIG. 3 continues from the left side of FIG. 1 and provides an example of further processing of the consolidated laminate 102.

As depicted in FIG. 3, the consolidated laminate 102 can be cut or segmented, for example using a cutter 300 such as one or more blades, laser cutters, thermal cutters, etc., into a plurality of prepreg blanks 302. The prepreg blanks 302 can be placed in storage 304 until needed for subsequent use.

Next, each prepreg blank 302 can be removed from storage and processed, for example, molded using a heated mold 306 into a final product 308.

Prior to initiating a stable production run, one or more qualification runs can be performed to ensure the conveyor assembly 100 is operating sufficiently. For example, the heater(s) 152, 153 can be activated, the prepreg sheets 142 can be introduced into the processing zone 130 between the pressure plates 120, 122, the conveyors 104, 108 can be activated, and one or more blanks 302 can be formed and tested to confirm that the one or more blanks 302 are processed correctly. Initial blanks 302 that do not conform to testing tolerances can be reworked or discarded. The temperature(s) of the heater(s) 152, 153 can be increased or decreased to raise or lower the heating of the prepreg sheets 142, and the speed (i.e., turn rate) of the conveyors 104, 108 can be decreased or increased to raise or lower the heating of the prepreg sheets 142. Further, the distance between the rigid plates 112, 114 can be increased or decreased to decrease or increase respectively the compressive pressure placed onto the prepreg sheets 142 by the faces 150, 151 of the pressure plates 120, 122 within the processing zone 130. Adjustment of other processing parameters, depending on the individual design of the conveyor assembly 100, is contemplated, until the blanks 302 produced conform to testing tolerances.

Figure 4:
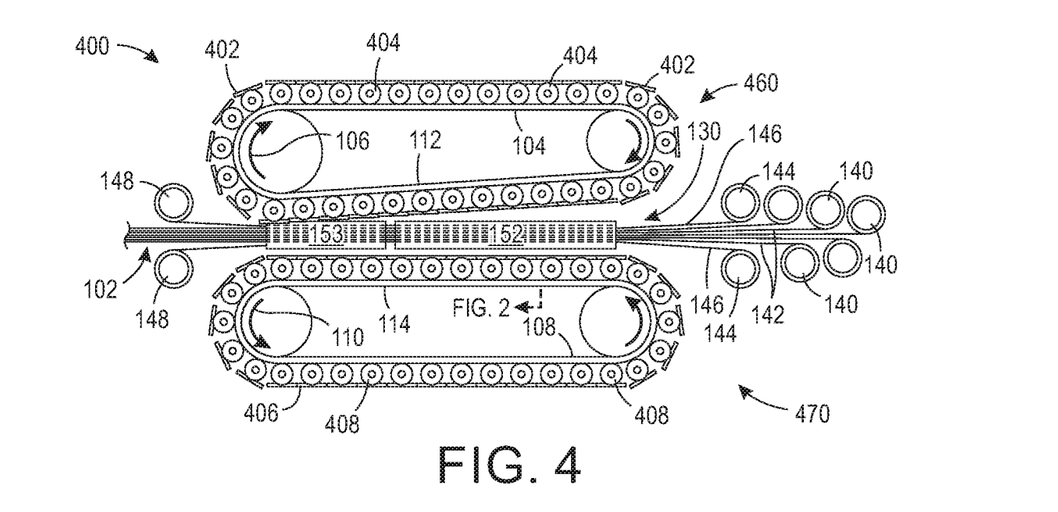
FIG. 4 is a side view of another conveyor assembly according to the present teachings.

It will be appreciated that the design of the conveyor assembly 100 depicted and described with reference to FIGS. 1 and 2 is merely a non-limiting example conveyor assembly according to an implementation of the present teachings, and that other conveyor subsystem designs are contemplated. For example, FIG. 4 is a side view of a conveyor assembly 400 in accordance with another implementation. The conveyor assembly 400 of FIG. 4 can include an upper (i.e., a first) conveyor subassembly 460 and a lower (i.e., second) conveyor subassembly 470. This implementation includes a plurality of upper (e.g., first) pressure plates 402 attached to a plurality of upper (e.g., first) rollers 404 which, in turn, are attached to the upper conveyor 104, and further includes a plurality of lower (e.g., second) pressure plates 406 attached to a plurality of lower (e.g., second) rollers 408 which, in turn, are attached to the lower conveyor 108. During use, each pressure plate 402, 406 is advanced into the processing zone 130 by the conveyors 104, 108 and physically contacts the metal foil 146 within the processing zone 130, where each upper pressure plate 402 is aligned with a paired lower plate 406. A compressive pressure is applied to the plurality of prepreg sheets 142 within the processing zone to adhere the prepreg sheets 142 together to form the consolidated laminate 102.

In contrast to the FIG. 1 conveyor assembly 100 where the rigid upper plate 112 is generally parallel to the rigid lower plate 114, in FIG. 4 the rigid upper plate 112 is not parallel to the rigid lower plate 114. In this implementation, a first distance between the two rigid plates 112, 114 at a first side (e.g., the right side referring to the orientation of FIG. 4) of the conveyor assembly 400 where the plurality of prepreg sheets 142 enter the processing zone 130 is greater than a second distance between the two rigid plates 112, 114 at a second side (e.g., the left side referring to the orientation of FIG. 4) where the plurality of prepreg sheets 142 exit the processing zone 130. This arrangement of rigid upper and lower plates 112, 114 allows the plurality of prepreg sheets 142 to be spaced from each other as they begin to be heated by the first heater 152, which may allow for improved heating of the prepreg sheets 142, particularly toward a middle of a width of the prepreg sheets 142. As the prepreg sheets 142 continue through the processing zone 130, the upper and lower pressure plates 402, 406 physically contact the metal foil 146 and apply the compressive pressure to the prepreg sheets 142. It will be appreciated that the planar misalignment of the upper and rigid lower plates 112, 114 is exaggerated in FIG. 4 for purposes of explanation.

Figure 5:
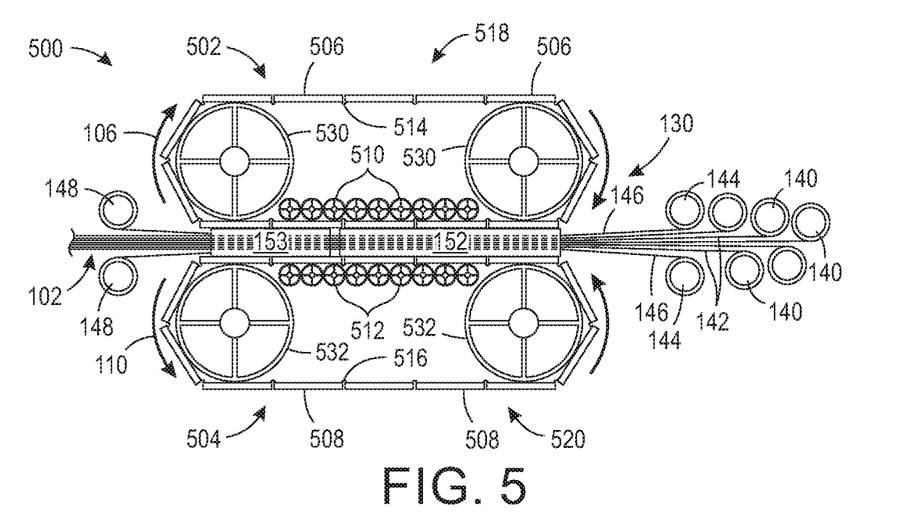
FIG. 5 is a side view of another conveyor assembly according to the present teachings.

FIG. 5 depicts a conveyor assembly 500 according to another implementation of the present teachings including an upper (e.g., a first) conveyor subassembly 502 and a lower (e.g., a second) conveyor subassembly 504. In this implementation, the conveyors of the implementations described above are provided by a plurality of interconnected upper (e.g., first) pressure plates 506 and a plurality of interconnected lower (e.g., second) lower plates 508. Further, the rigid plates 112, 114 of the implementations described above are provided by a plurality of upper (e.g., first) rigid pressure wheels 510 and a plurality of lower (e.g., second) rigid pressure wheels 512. In this implementation, the upper pressure plates 506 are physically connected together using a first plurality of links 514 such as hinges, pinned connections, or another mechanical attachment that permits rotation of the upper pressure plates 506, and the lower pressure plates 508 are similarly physically connected together using a second plurality of links 516 as depicted, to form a upper (e.g., first) and lower (e.g., second) conveyors 518, 520 respectively. The upper conveyor 518 can be turned using at least one upper (e.g., first) drive wheel 530, and the lower conveyor 520 can be turned using at least one lower (e.g., second) drive wheel 532.

During use of the conveyor assembly 500, the upper drive wheel 530 turns the upper conveyor 518 and the lower drive wheel 532 turns the lower conveyor 520 in opposite directions 106, 110. The turning of the conveyors 518, 520 advances each of the pressure plates 506, 508 into the processing zone 130. As with the implementations described above, each upper pressure plate 506 is aligned with a lower pressure plate 508 with which it is paired within the processing zone 130. In this implementation, the upper pressure wheels 510 apply a force against the upper pressure plates 506, and the lower pressure wheels 512 apply a force against the lower pressure plates 508. In turn, the forces applied to the pressure plates 506, 508 by the pressure wheels 512, 512 cause the pressure plates 506, 508 to apply a compressive pressure to the metal foil 146 and the prepreg sheets 142. In this implementation, the conveyor assembly 500 is designed so that each pressure plate 506, 508 is physically contacted by at least two or more pressure wheels 510, 512 respectively so that an even compressive pressure can be applied to the prepreg sheets 142 within the processing zone 130.

Thus the present teachings, in part, provide a tooling concept which may be capable of rapid consolidation of carbon fiber reinforced thermoplastic material. Components can include rigid upper and lower plates, spring-loaded pressure plates guided by tracks formed by the upper and rigid lower plates, a conveyor which pulls the prepreg sheets through the tool, and a heating mechanism to melt the prepreg sheets, where the prepreg sheets include a thermoplastic. In another implementation, compressive pressure can be applied using a plurality of rigid pressure wheels. In either case, adequate pressure is not applied conventionally using, for example, hydraulic or pneumatic cylinders, but using a passive technique, thereby simplifying the system considerably and drastically reducing maintenance compared to conventional systems. With the present teachings, the only aspects of the system that require electrical power are the heating element(s) and a motor to drive the upper and lower conveyers. The pressure plates provides sufficient compressive pressure to consolidate the prepreg sheets to form the consolidated laminate after the thermoplastic within the prepreg sheets is melted via a heating source. The prepreg sheets will travel through the length of the upper and rigid lower plates, under constant pressure via the pressure plates, and during travel be heated and consolidated into the consolidated laminate. The prepreg sheets will travel at a speed to allow sufficient heat-up time, autohesion of the thermoplastic polymer, and cool-down time. The processing speed at which this occurs is dictated by the specific melt temperatures and cool-down temperatures of the resin that is being processed. Therefore, this system would be capable of producing a consolidated laminate with a variety of different resins in a continuous fashion.

In contrast to conventional processes that use thermoset prepregs and a shaped mandrel to form the thermoset prepregs, the present teachings include the use of a conveyor assembly to form a consolidated laminate from a plurality of thermoplastic prepreg sheets. The consolidated laminate can be stored for an indefinite duration, the processed at a later time, which can include a subsequent molding process.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A conveyor assembly for processing a plurality of prepreg sheets, comprising:
    a first conveyor subassembly, comprising:
        a first conveyor configured to turn in a first direction;
        a plurality of first pressure plates attached to the first conveyor, wherein each first pressure plate of the plurality of first pressure plates comprises a first face; and
        a rigid first plate comprising a track, wherein the first conveyor is positioned within the track of the rigid first plate;
    a second conveyor subassembly, comprising:
        a second conveyor configured to turn in a second direction opposite the first direction;
        a plurality of second pressure plates attached to the second conveyor, wherein each second pressure plate of the plurality of second pressure plates comprises a second face; and
        a rigid second plate comprising a track, wherein the second conveyor is positioned within the track of the rigid second plate;
    a processing zone positioned between the first conveyor subassembly and the second conveyor subassembly;
    two metal foil supply creels configured to supply respective metal foil layers to the plurality of prepreg sheets;
    two metal foil take-up creels configured to receive the respective metal foil layers from the two metal foil supply creels;
    at least one heater positioned in the processing zone;
    a first plurality of springs attached to the plurality of first pressure plates and the first conveyor.

2. The conveyor assembly of claim 1, further comprising a plurality of material supply creels configured to supply the plurality of prepreg sheets to the processing zone of the conveyor assembly.

3. The conveyor assembly of claim 2, wherein the plurality of prepreg sheets are disposed on the plurality of material supply creels and positioned between a plurality of the first faces and a plurality of the second faces within the processing zone.

4. The conveyor assembly of claim 3, wherein the plurality of the first faces and the plurality of the second faces apply a compressive pressure to the plurality of prepreg sheets within the processing zone.

5. The conveyor assembly of claim 4, wherein the compressive pressure is from 1.0 bar to 50.0 bar.

6. The conveyor assembly of claim 1, further comprising two metal foil layers on the two metal foil supply creels, wherein:
    the two metal foil layers are positioned between the plurality of the first faces and the plurality of the second faces within the processing zone; and
    the plurality of the first faces and the plurality of the second faces apply a compressive pressure to the two metal foil layers within the processing zone.

7. The conveyor assembly of claim 1, further comprising:
    a second plurality of springs attached to the plurality of second pressure plates and the second conveyor,
    wherein the first plurality of springs and the second plurality of springs are configured to apply a compressive pressure to a plurality of prepreg sheets within the processing zone.

* * * * *